United States Patent
Babin et al.

(10) Patent No.: US 7,134,868 B2
(45) Date of Patent: Nov. 14, 2006

(54) INJECTION MOLDING NOZZLE WITH WEAR-RESISTANT TIP HAVING DIAMOND-TYPE COATING

(75) Inventors: Denis Babin, Georgetown (CA); Hans Guenther, Georgetown (CA); Rhonda Goslinski, Bolton (CA)

(73) Assignee: Mold-Masters Limited, Georgetown (CA)

( * ) Notice: Subject to any disclaimer, the term of this patent is extended or adjusted under 35 U.S.C. 154(b) by 302 days.

(21) Appl. No.: 10/722,120

(22) Filed: Nov. 26, 2003

(65) Prior Publication Data

US 2005/0112231 A1    May 26, 2005

(51) Int. Cl.
B29C 45/20    (2006.01)

(52) U.S. Cl. .................. 425/549; 264/328.15

(58) Field of Classification Search ........... 425/549, 425/406; 264/328.15
See application file for complete search history.

(56) References Cited

U.S. PATENT DOCUMENTS

| | | | |
|---|---|---|---|
| 4,768,283 A | 9/1988 | Gellert | |
| 4,768,945 A | 9/1988 | Schmidt et al. | |
| 4,950,154 A | 8/1990 | Moberg | |
| 4,997,686 A | 3/1991 | Feldstein et al. | |
| RE33,767 E | 12/1991 | Christini et al. | |
| 5,145,517 A | 9/1992 | Feldstein et al. | |
| 5,268,184 A | 12/1993 | Gellert | |
| 5,300,330 A | 4/1994 | Feldstein et al. | |
| 5,387,447 A | 2/1995 | Slutz et al. | |
| 5,421,716 A | 6/1995 | Gellert | |
| 5,513,976 A | 5/1996 | McGrevy | |
| 5,569,475 A | 10/1996 | Adas et al. | |
| 5,658,604 A | 8/1997 | Gellert et al. | |
| 5,827,613 A | 10/1998 | Nakayama et al. | |
| 5,863,616 A | 1/1999 | Feldstein et al. | |
| 5,925,386 A | 7/1999 | Moberg | |
| 6,129,541 A | 10/2000 | Takeda | |
| 6,159,000 A | 12/2000 | Puri et al. | |
| 6,306,466 B1 | 10/2001 | Feldstein et al. | |
| 6,331,106 B1 | 12/2001 | Helldin | |
| 6,656,329 B1 * | 12/2003 | Ma et al. ............... | 425/406 |
| 2002/0094379 A1 | 7/2002 | Sung | |
| 2002/0178862 A1 | 12/2002 | Smith et al. | |
| 2002/0187349 A1 | 12/2002 | Richter et al. | |
| 2003/0086997 A1 | 5/2003 | Olaru | |

FOREIGN PATENT DOCUMENTS

| | | |
|---|---|---|
| FR | 2 273 646 | 2/1976 |
| JP | 61 272119 | 12/1986 |
| JP | 10 235653 | 9/1998 |
| WO | WO 00/09311 | 2/2000 |

OTHER PUBLICATIONS

Husky, "Wear Resistant Nozzle Tips" Advertisement, Publication date of at least Sep. 25, 2003.

* cited by examiner

*Primary Examiner*—Tim Heitbrink
(74) *Attorney, Agent, or Firm*—Medler Ferro PLLC

(57) ABSTRACT

An injection molding nozzle with a tip portion in the gate area of the mold that has a wear-resistant diamond-type coating. The surface of the tip melt channel that delivers melt to the gate area may also comprise a diamond-type coating. Nozzle seal surfaces in the gate area may also comprise a diamond-type coating. The enhanced harness, smoothness and thermal conductivity of these coated surfaces results in higher quality molded parts, and easier to clean molding equipment that has a longer service life.

19 Claims, 6 Drawing Sheets

INJECTION MOLDING NOZZLE WITH WEAR-RESISTANT TIP HAVING DIAMOND-TYPE COATING

This invention relates to hot runner injection molding apparatus and, in particular, to a hot runner injection molding nozzle having a wear-resistant tip.

BACKGROUND

Hot runner nozzles used for injection molding must efficiently transfer heat to the melt flowing therethrough to ensure proper flow of the pressurized molten material (melt) through the gate and into the mold cavity. If high heat transfer were the only consideration, copper, with its high thermal conductivity and relatively low cost, would make an excellent choice for the construction of injection nozzles, including the nozzle tip and the nozzle seal that reside in the vestige area of the mold, adjacent the gate. However, copper is subject to rapid wear because of its relative softness.

Wear of the nozzle tip and the nozzle seal can diminish nozzle performance and degrade the appearance of molded parts, especially in the vestige area. Wear of these parts in this constricted area is caused by the abrasive effect of the rapidly flowing melt, especially when the melt contains a filler, such as glass fibers. The melt tends to abrade and sometimes corrode unprotected nozzle tip and seal surfaces, resulting in frequent and costly tip and seal replacement. These problems are especially troublesome when color changeover occurs because residual melt of the previous color must be completely removed prior to molding with a new color, and this is difficult to accomplish when the vestige areas of these parts are worn and roughened.

It is known to enhance the wear resistance of these parts by making them of a beryllium copper alloy, which is harder than copper and has good thermal conductivity. See, e.g., U.S. Pat. No. 5,268,184. However, this alloy has been found to be unacceptably susceptible to abrasion and corrosion by certain types of melt material. Further, as beryllium is known to have toxic properties, nozzle parts made of this alloy cannot be used for molding articles for the food industry.

It is known to enhance the wear resistance of a hot runner nozzle tip by using an injection-molded torpedo made of tungsten carbide. See, e.g., U.S. Pat. No. 5,658,604, which is incorporated herein by reference. However, the shape of the torpedo is limited by molding practicalities, and tungsten carbide has a relatively low thermal conductivity as compared to copper. Further, tungsten carbide is brittle and tends to chip. Wear-resistant nozzle tip ends of tungsten carbide are also known (see, e.g., FIG. 5 of published U.S. patent application US 2003/0086997), but such tip ends often are difficult to mount securely, or are not easily removed when they do wear out and need to be replaced.

A need therefore exists for an injection molding nozzle that efficiently produces high quality molded products for any industry, and has a long and dependable service life.

The prior art has addressed wear resistance in other portions of injection molding nozzles. For example, US 2003/0086997 discloses a tungsten carbide liner for the melt channel within the nozzle body. U.S. Pat. No. 6,129,541 discloses an injection molding nozzle with a movable valve pin having a wear-resistant titanium coating.

Diamond and diamond-like carbon coatings have been used in the injection molding field, e.g. to protect moving parts such as ejector pins, or to coat the surface of a mold (see U.S. Pat. No. 5,827,613, and published U.S. patent application US 2002/0187349). Prior to the development of this invention, however, such coatings have not been used in the gate area portions of a hot runner nozzle.

DESCRIPTION OF THE INVENTION

The invention is described below with reference to the accompanying drawing figures, in which.

The same reference numbers are used to designate elements that are common to the different disclosed embodiments. It is to be understood that the invention is not limited in its application to the details of construction of the illustrated and described examples, and that the scope of the invention is defined by the appended claims.

Figure 1:
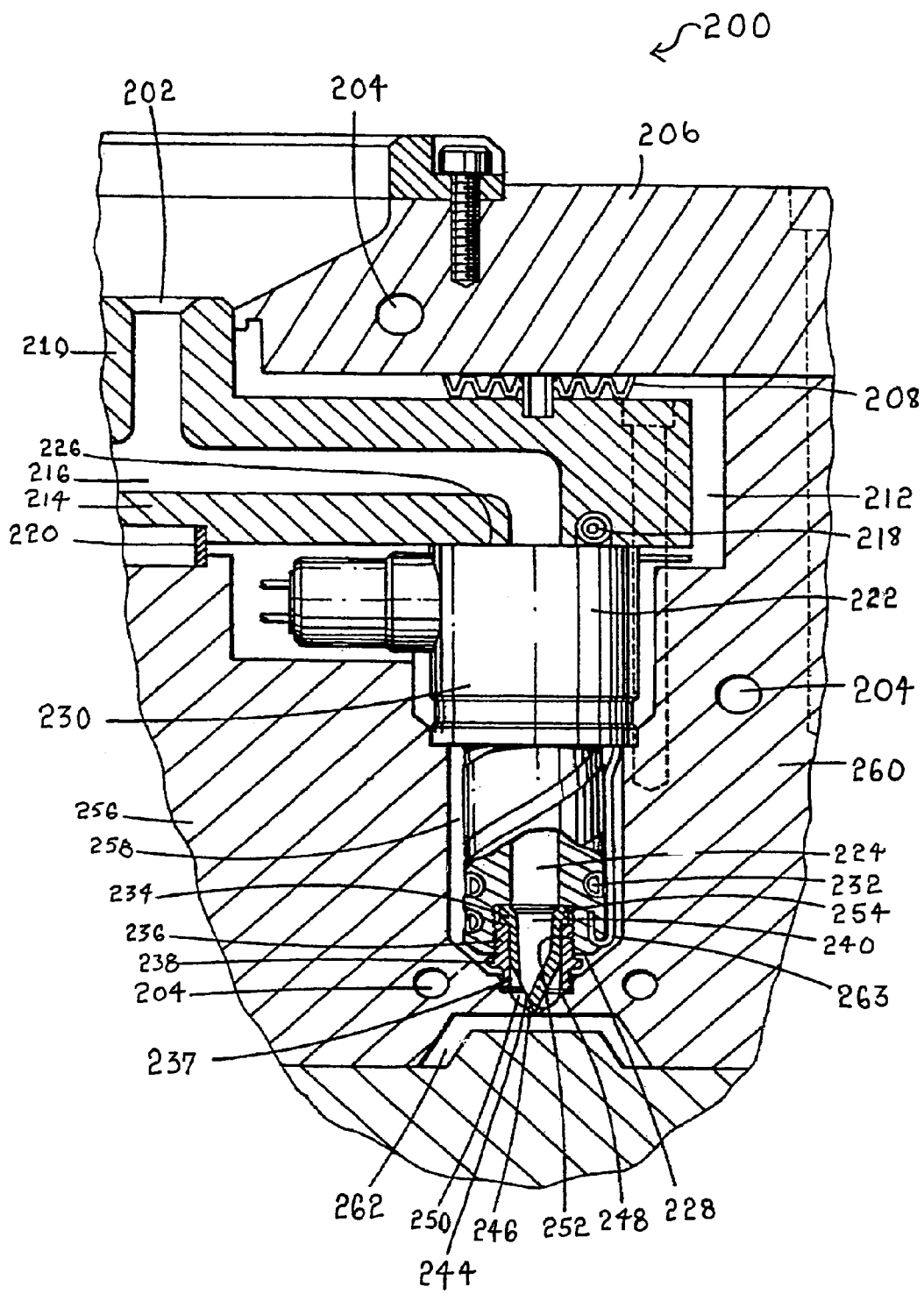
FIG. 1 is a vertical sectional view through a portion of a hot runner injection molding apparatus showing a nozzle according to the invention.

Referring to FIG. 1, a hot runner injection molding apparatus 200 according to the invention comprises a mold 256 having a cavity plate 260 in which at least one mold cavity 262 is located, and a back plate 206 adjacent the cavity plate. A manifold 214, positioned by a locating ring 220, distributes molten material (melt) from a central melt inlet 202 via inlet portion 210 and manifold melt channel 216 to a plurality of injection nozzles 222, only one of which is shown. An insulative, resilient spacer 208 separates the manifold 214 from the back plate 206, and an insulative air space 212 separates manifold 214 from cavity plate 260. The rear end 226 of the nozzle 222 abuts manifold 214. The front end 228 of the nozzle has a nozzle seal 236 with a front end 237 that mates with a seat 248 in the cavity plate 260 adjacent a gate orifice 246, thus defining a circular space 250 through which melt flows from the nozzle to the gate orifice 246. A manifold heating element 218 maintains the temperature of the melt so that it flows properly to the nozzles. Cooling channels 204 in the back plate 206 and the cavity plate 260 carry coolant for removing excess heat from the apparatus.

The nozzle 222 further comprises an outer collar 230, a nozzle melt channel 224, and a nozzle heating element 232, which serves to maintain proper melt temperature as the melt flows through the nozzle melt channel. A thermocouple 263 adjacent the front end of the nozzle provides control feedback for heating element 232. An insulative air space 258 surrounds the body of the nozzle.

The rear portion of nozzle seal 236 is externally threaded so that it is removably secured in a threaded nozzle seat 252. An outwardly extending flange 238 on nozzle seal 236 is shaped (e.g., hexagonally) so that it can be removed or installed using an appropriate tool, such as a wrench. When installed in seat 252, nozzle seal 236 surrounds and retains a torpedo-shaped nozzle tip 234 in position on the nozzle.

Figure 2:
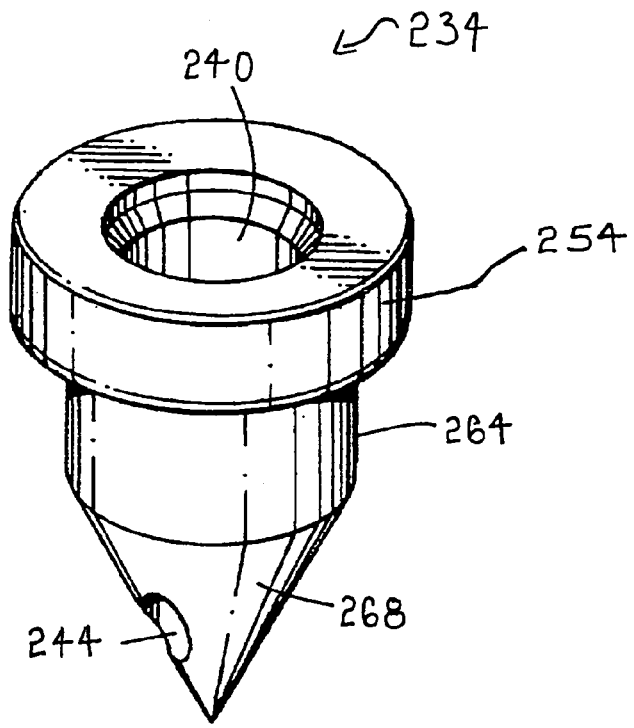
FIG. 2 is a perspective view of a nozzle tip according to the invention.
Figure 3:
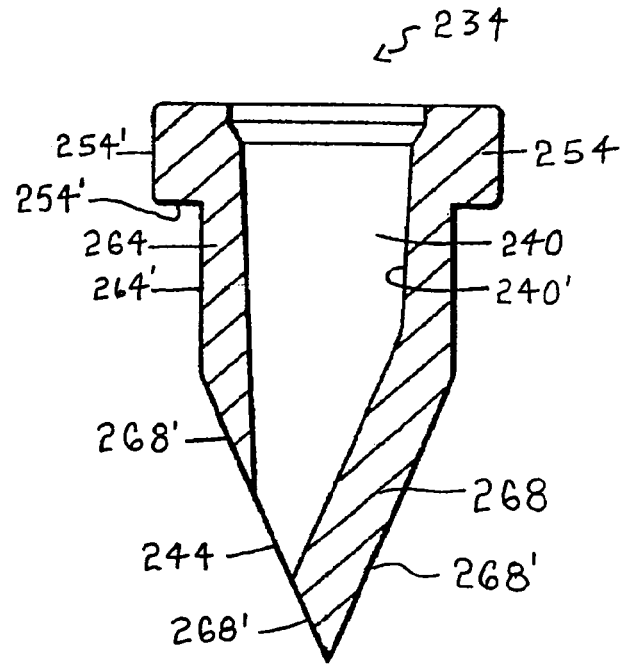
FIG. 3 is a vertical sectional view through the nozzle tip of FIG. 2.

Referring to FIGS. 2 and 3, nozzle tip 234 comprises a cylindrical central portion 264, a wider cylindrical rear flange portion 254, and a tapered tip portion 268. Rear flange portion 254 of nozzle tip 234 is captured in nozzle seat 252 by the rear end of nozzle seal 236. A central torpedo melt channel 240 in nozzle tip 234 communicates at its upper end with nozzle melt channel 224, and has a lateral melt outlet 244 that delivers melt to the circular space 250 adjacent the gate orifice 246.

The above-described structure is fairly typical of a contemporary hot runner injection molding system having a diverted tip nozzle. There may be a single melt outlet 244 as illustrated, or a plurality of melt outlets (e.g., two or three). In this, as well as in the other embodiments described herein, the nozzle tip may be made of any suitable material that is commonly used in this art, such as tool steel, stainless steel, titanium, bronze, other copper alloys, tungsten carbide, or ceramic.

Figure 4:
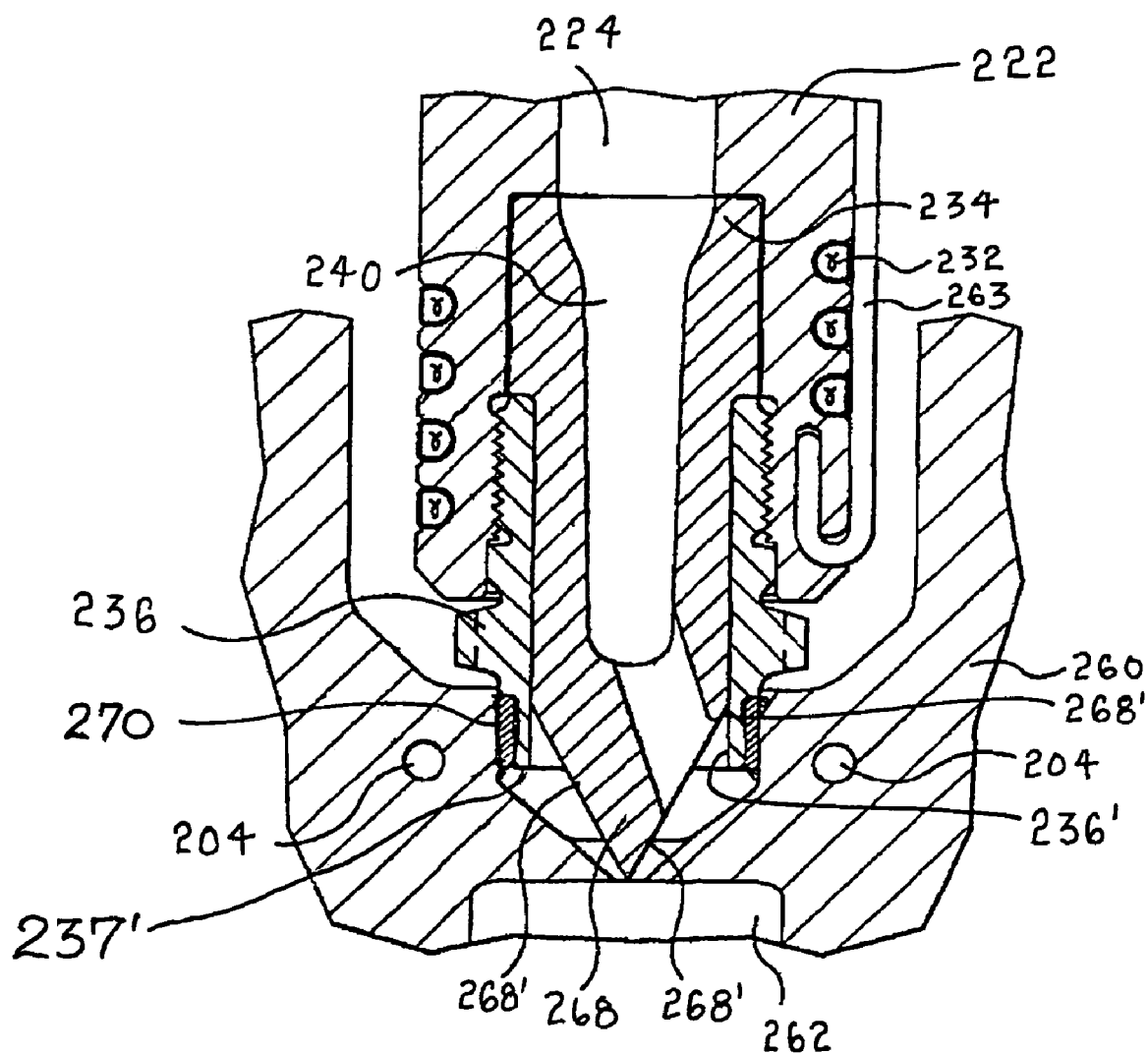
FIG. 4 is a vertical sectional view through the gate portion of a hot runner injection molding apparatus according to the invention, showing a three-piece diverted nozzle tip.

Alternatively, as shown in FIG. 4, the nozzle may have a three-piece diverted tip assembly comprising torpedo nozzle tip 234, threaded nozzle seal 236, and an insulation ring 270 that contacts the mold cavity plate 260.

Figure 5:
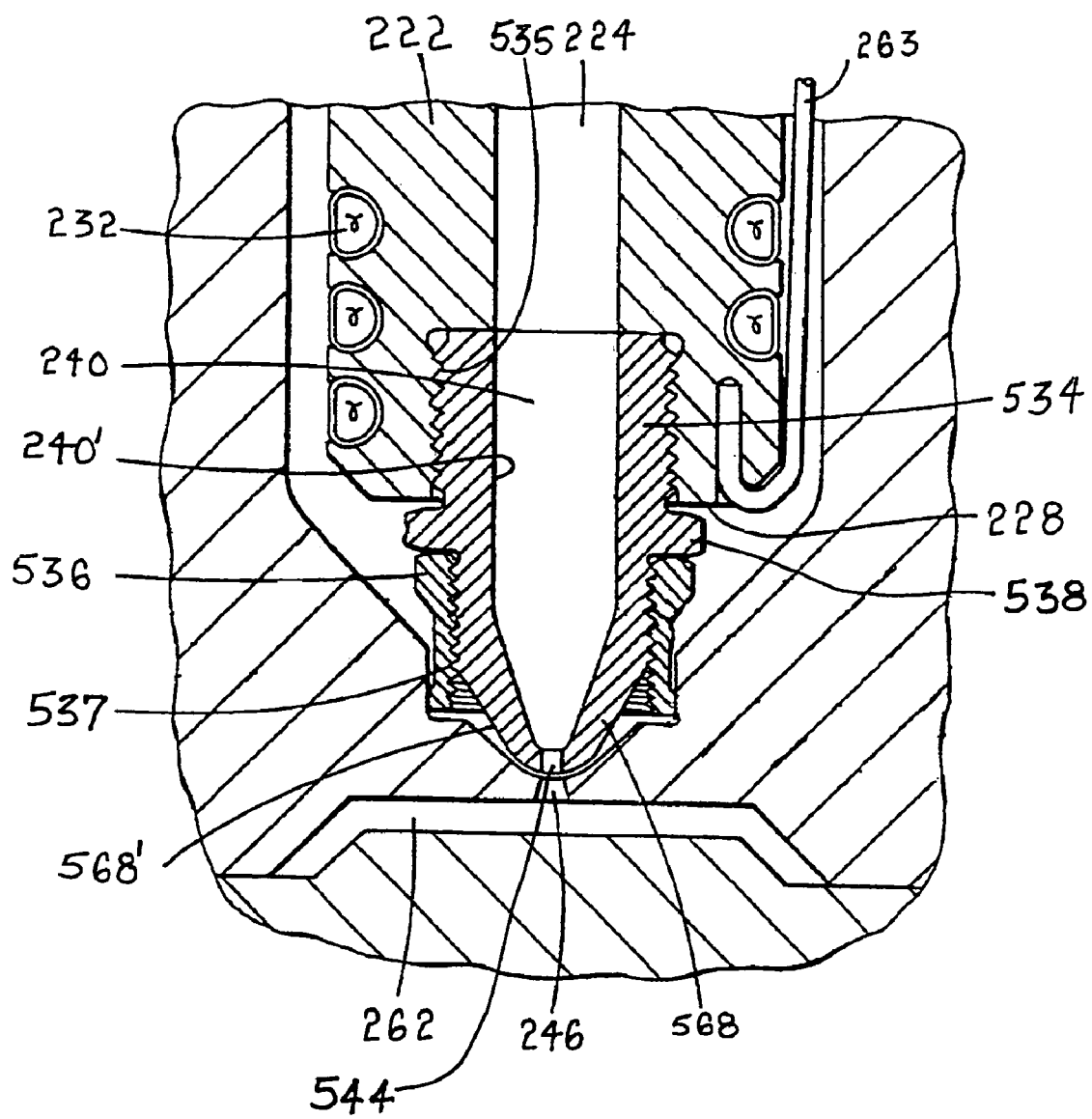
FIG. 5 is a vertical sectional view similar to FIG. 4, showing a two-piece nozzle tip.

FIG. 5 shows another embodiment, in which the torpedo nozzle tip 534 is straight, with a tapered tip portion 568, and a straight melt channel 240 that leads to a central melt outlet 544. This nozzle tip is threaded at 535 into the nozzle 222, and the nozzle seal 536 is threaded at 537 onto the outside of nozzle tip 534. A flange 538 is adapted for engagement by a suitable tool (e.g., a wrench) to facilitate tip installation in and removal from the nozzle. Brazing or soldering can replace any of these threaded connections, if desired.

Figure 6:
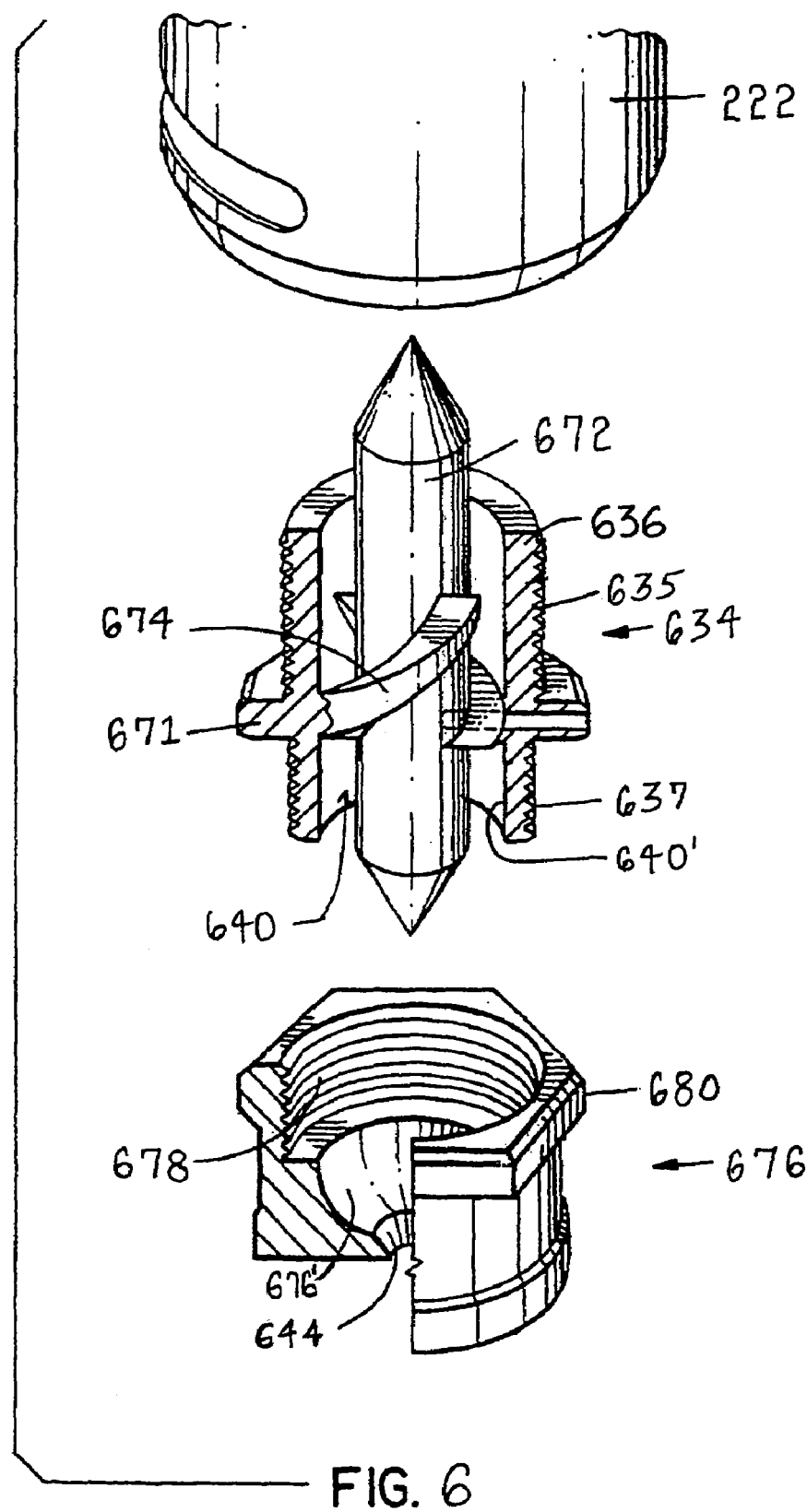
FIG. 6 is an exploded view of a torpedo nozzle tip according to the invention.

FIG. 6 shows yet another embodiment of a straight nozzle tip. A torpedo insert 634 comprises a cylindrical body 636 having a melt channel 640 in which a torpedo central body 672 is positioned by means of torpedo spirals (vanes) 674. Insert 634 is externally threaded at 635 for retention in nozzle 222, and has a tool-engageable flange 671. Insert 634 also has external threads at 637 for attaching a nozzle seal (gate insert) 676, which has mating threads 678 and a tool-engageable flange 680. Brazing or soldering can replace any of these threaded connections, if desired.

The invention provides a wear-resistant coating ("diamond-type coating," defined below) for at least certain portions of the nozzle tip. In the embodiment of FIGS. 2 and 3, the diamond-type coating is applied to the outer surface 268' of tapered tip portion 268, which surface typically is subject to the most wear by direct contact with the melt. The diamond-type coating may also be applied to the inner surface 240' of nozzle tip melt channel 240. The other surfaces (254', 264') of the nozzle tip 234 need not be coated because they do not come into direct contact with the melt; however, depending on the coating process used, it may be easier to coat all surfaces rather than mask selected ones off to prevent them from being coated.

In the embodiment of FIG. 4, the same surface, i.e., the outer surface 268' of tapered tip portion 268, is provided with a diamond-type coating. In addition, a diamond-type coating should also be applied to the annular end surface 237' of nozzle seal 236, as well as to the inner surface 236' of nozzle seal 236 in the region that surrounds the tapered nozzle tip portion 268, as these surfaces, too, come into direct contact with the melt. The diamond-type coating may also be applied to the inner surface 240' of nozzle tip melt channel 240. Again, it may be easier to coat all surfaces rather than mask selected ones off to prevent them from being coated.

In the embodiment of FIG. 5, the outer surface 568' of tapered tip portion 568 is provided with a diamond-type coating. The interior surface of nozzle seal 536 could also be provided with a diamond-type coating because a portion of that interior surface is exposed to melt in the annular space surrounding tapered tip portion 568. The diamond-type coating may also be applied to the inner surface 240' of nozzle tip melt channel 240. Again, it may be easier to coat all surfaces rather than mask selected ones off to prevent them from being coated.

In the embodiment of FIG. 6, a diamond-type coating is applied to the inner surface 676' of nozzle seal 676. The diamond-type coating may also be applied to the inner surface 640' of nozzle tip melt channel 640; to the surfaces of torpedo central body 672 and vanes 674; and to the surface of melt outlet 644. Again, it may be easier to coat all surfaces rather than mask selected ones off to prevent them from being coated.

As noted, the wear-resistant coating used in this invention is termed a "diamond-type coating," and is a diamond or diamond-like protective film or coating. As used in this application, the term "diamond-type coating" is defined as a protective layer or film of crystalline or amorphous carbon-containing material adhered to a substrate, either directly or through an intermediate layer of diverse material, the protective layer being substantially harder and smoother than the substrate or the intermediate layer.

A diamond-type coating can fall into one of two major categories: the composite type (metal and diamond mixture), and the diamond depositing type (amorphous and polycrystalline). Each type has strengths and weaknesses, and either can be used to protect portions of the hot runner system that directly contact the melt in the gate region, as described above. Research and development in this field is ongoing, with new methods being developed on a continuous basis that improve adhesion and surface finish.

U.S. Pat. No. 5,827,613, which is incorporated herein by reference, discusses methods for applying "diamond-like films" and "diamond-like thin films." The patent discusses problems of film adhesion and, in the case of high temperature deposition processes, undesirable annealing of the steel substrate. The patent also discloses uses of an intermediate layer to improve adhesion of the coating to the surface of a variety of substrates, such as steel, ceramic, glass, copper, metal alloys, etc. The intermediate layer can be made from silicon, titanium, or nickel, formed by vacuum deposition or chemical vapor deposition (CVD). Alternatively, for greater adhesion, a molybdenum intermediate coating can be applied by ionization evaporation.

Figure 7:
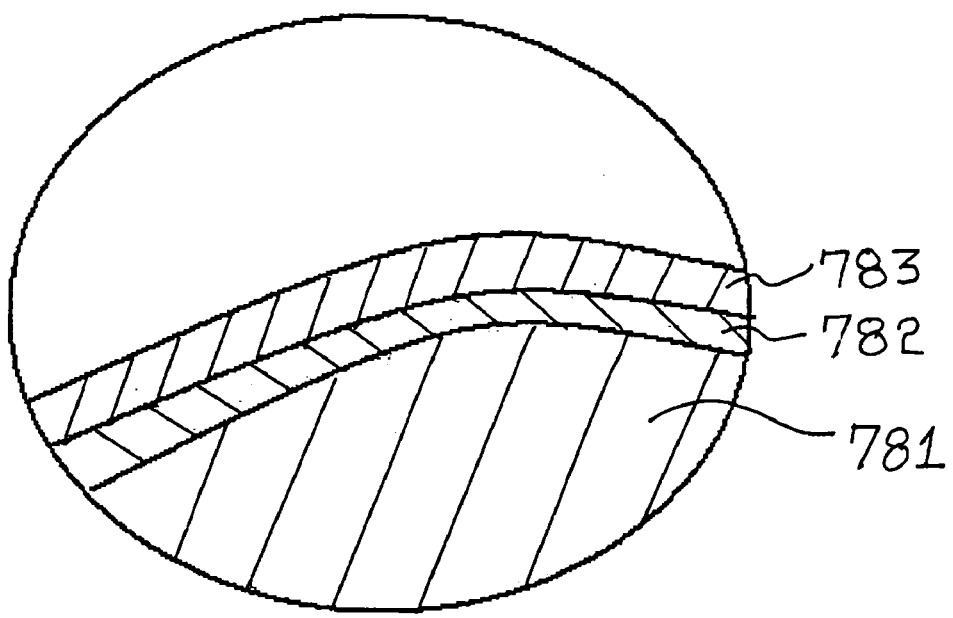
FIG. 7 is a magnified sectional view of a nozzle tip according to the invention, showing a diamond-type coating layer and an intermediate layer on the tip substrate.

In accordance with this invention, the wear-resistant films and the methods of adhesion disclosed in U.S. Pat. No. 5,827,613 can be used to protect portions of the hot runner system that directly contact the melt in the gate region. FIG. 7 depicts the nozzle tip substrate 781, an intermediate layer 782 as described above, and a diamond-type coating 783. The coating or film 783 is extremely hard, and has a low coefficient of friction, high thermal conductivity (on the order of 4 to 5 times the thermal conductivity of beryllium copper), and excellent resistance to corrosion and chemicals. Empirical data pertaining to these properties can be found in U.S. Pat. No. 5,827,613. For example, a diamond-like thin film applied to a steel substrate over a molybdenum intermediate layer was shown to have a hardness on the order of 7,000 Vickers (compare to tool steel at 400 Vickers).

Figure 8:
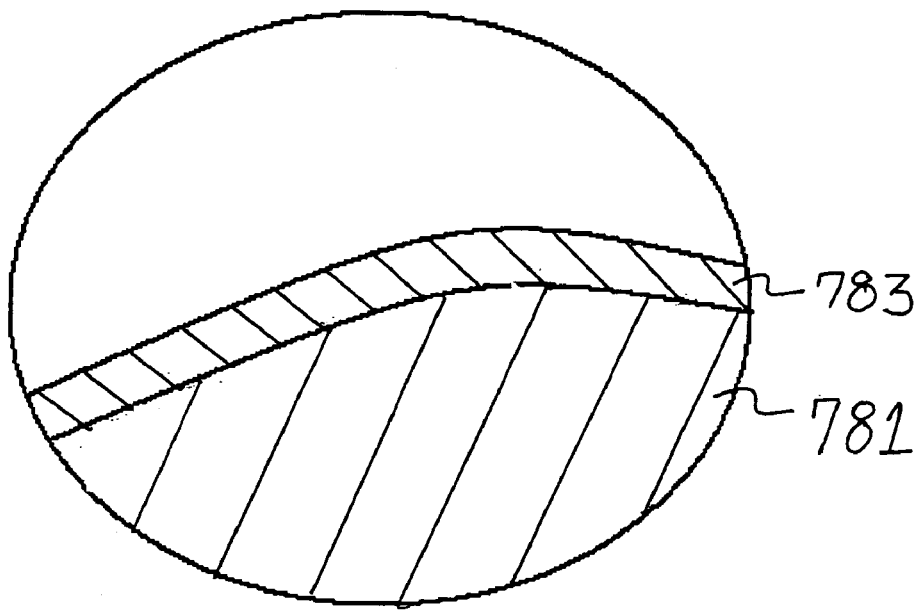
FIG. 8 is a magnified view similar to FIG. 7, showing a diamond-type coating layer on the tip substrate.

Composite diamond coating, patented by Surface Technology, Inc. (see U.S. Pat. Nos. 4,997,686; 5,145,517; 5,300,330; 5,863,616; and 6,306,466, all of which are incorporated herein by reference), involves the use of ultra fine diamond particles contained within hard electroless nickel metal. Application to a substrate is done in an electroless plating bath with suspended diamond particles. Because a metallizing bath is used, the geometry of the substrate is substantially irrelevant, and recesses and holes can be coated without concern for line-of-sight requirements. Coating thickness can range from 12 to 250 microns, although typically the thickness is on the order of 25 microns, and tolerance is ±3 microns for any specified thickness. Coating hardness is 1,200 Vickers. Wear resistance, using the Taber abrasive wear test, is very high at 0.0115 (compare to 0.0274 for cemented tungsten carbide; and to 0.1281 for hardened tool steel). Advantageously, coated parts can be stripped and re-coated to refurbish them. FIG. 8 depicts a nozzle tip according to the invention that has a composite diamond coating 783, such as that described above, applied to the nozzle tip substrate 781.

Amorphous diamond coatings may also be used for this invention. These have a non-crystalline structure, which gives a very smooth surface finish. However, the wear properties are not as good as those for polycrystalline structure diamond coatings, described below. Amorphous diamond coatings are applied by means of plasma acceleration, using a pulsed plasma arc discharger in a vacuum. This can be done at room temperature. New advances in this technology have led to stress-free, very smooth amorphous coatings with good adhesion that have a hardness that is 90% of that of crystalline diamond coatings.

One stress-reduced or stress-free amorphous diamond coating uses a pulsed laser on a graphite target to deposit, at room temperature, an amorphous, hydrogen-free carbon film with a high percentage of diamond-like bonds but with high initial stress. When the deposited material is heated, the film loses its stress, yet retains its diamond-like properties. In contrast, amorphous diamond films that contain hydrogen convert to graphite upon heating.

Polycrystalline structure diamond coatings may also be used for this invention. These are typically produced using chemical vapor deposition (CVD) and physical vapor deposition (PVD) techniques. The more crystalline structure increases the hardness of the coating, but reduces the smoothness of the surface finish. CVD removes the carbon atoms from methane gas and deposits them directly onto the substrate as a diamond. Continuous, homogeneous films of polycrystalline structure diamond have been applied to machine tools.

Both amorphous and polycrystalline diamond coatings work well on substrates of graphite, hard carbon, brass, other copper alloys, plastics and ceramics. Ferrous metals may dissolve these coatings, so an intermediate coating on ferrous metals is necessary.

Another useful method of applying a diamond or diamond-like carbon coating to the nozzle tip is plasma-assisted chemical vapor deposition (PACVD). This method is said to produce very a smooth surface with excellent adhesion.

The above and other diamond-type coatings and coating techniques, all useful in this invention, are described in the above-mentioned patents and publications, and in the following additional patents and publications, all of which are incorporated herein by reference:

U.S. Pat. No. 5,387,447
U.S. Pat. Re. 33,767
Published U.S. patent application US 2002/0094379
"Composite Diamond Coating." Website of Surface Technology, Inc. http://www.surfacetechnology.com/cdc.htm
Browne, Malcolm W. "Diamond Coating Could Revolutionize Manufacture of Tools." Mar. 12, 1996 by Rohit Khare (khare@pest.w3.org) (http://www.xent.com/FoRK-archive/spring96/0270.html
McGinnis, Arthur J; Jagannadham, K.; Watkins, Thomas R. "Residual Stresses in $MO_2C$/Diamond Coatings." Advances in X-ray Analysis, V. 41, 1998.
ter Meulen, J. J. Smooth, well-adhering CVD diamond coatings on steel and non-carbide forming substrates. http://www.stw.nl/projecten/N/nns4041.html
RRC Kurchatov Institute. "Artificial Diamond Coating and Thin Film Technologies." http://www.kiae.ru/eng/inf/tex/t8.html
Miyoshi, Kazuhisha. "Diagnostic Techniques Used to Study Chemical-Vapor-Deposited Diamond Films." http://www.grc.nasa.gov/WWW/RT1999/5000/5160miyoshi.html. April, 2000.
"Wear-resistant diamond coating created by Sandia scientists." http://www.sandia.gov/1100/Xfried_diamond.htm. Nov. 30, 2001.
"Diamond Coatings." Website of MER Corporation. http://www.mercorp.com/mercorp/coatings/Diamond-_Coatings.html
"Amorphous diamond coatings for industrial and medical applications." http://www.physics.helsinki.fi/~ftl_dlc/index.html
"DIARC® Diamond Coating for Moulding Tools." http://www.diarc.fi/moulds.html
Paulmier, D.; Schmitt, M. "Elaboration and mechanical properties of diamond coatings obtained by flame process." http://www.eng.auburn.edu/department/ee/ADC-FCT2001/ADCFCT . . .
Myers, Dennis. "Cutting Costs with Diamond Coatings." Ceramic Industry Online. Jul. 1, 2002. http://www.ceramicindustry.com/CDA/ArticleInformation/features/ . . .

The application of a diamond-type coating to portions of a hot runner nozzle in the gate region thus will increase efficiency, reduce cost, and yield superior molded parts for all industries.

The invention claimed is:

1. An injection molding apparatus, comprising:
a hot runner manifold, at least one nozzle, and a mold,
wherein the mold defines a mold cavity and a gate into the mold cavity for receiving melt from the nozzle,
wherein the nozzle comprises a nozzle body, a rip, and a nozzle seal attached to the nozzle body and surrounding the tip,
wherein the nozzle body comprises a melt channel therethrough for receiving melt from the manifold,
wherein the tip comprises a tip melt channel therethrough that is downstream from and in fluid communication with the nozzle body melt channel, and is positioned upstream from and in fluid communication with the gate,
wherein the nozzle seal contacts the mold adjacent the gate such that the mold, the nozzle seal and the tip define an annular melt space adjacent the gate through which melt can flow from the tip melt channel to the gate, and
wherein the tip comprises a first material including an exterior surface in the annular melt space, and wherein at least a portion of the exterior surface is coated with a first diamond or diamond-like coating.

2. An injection molding apparatus according to claim 1, wherein the surfaces of the nozzle seal that are exposed to the annular melt space comprise a second diamond or diamond-like coating.

3. An injection molding apparatus according to claim 2, wherein an interior surface of the tip adjacent the tip melt channel comprises a third diamond or diamond-like coating.

4. An injection molding apparatus according to claim 1, wherein an interior surface of the tip adjacent the tip melt channel comprises an additional diamond or diamond-like coating.

5. An injection molding apparatus according to any one of claims 1 to 4, wherein the diamond or diamond-like coating is applied directly to the surface(s).

6. An injection molding apparatus according to any one of claims 1 to 4, wherein the diamond or diamond-like coating is applied to an intermediate layer of a different material applied directly to the surface(s).

7. An injection molding apparatus according to claim 6, wherein the intermediate layer comprises molybdenum.

8. A nozzle for an injection molding apparatus, the injection molding apparatus having a mold defining a mold cavity and a gate into the mold cavity for receiving melt from the nozzle, the nozzle comprising:
   a nozzle body comprising a nozzle body melt channel therethrough for receiving melt from a melt source;
   a tip comprising a tip melt channel therethrough tat is downstream from and in fluid communication wit the nozzle body melt channel, and is adapted to be positioned upstream from and in fluid communication with the gate; and
   a nozzle seal attached to the nozzle body and surrounding the tip, the nozzle seal adapted to contact the mold adjacent the gate such that the mold, the nozzle seal and the tip define an annular melt space adjacent the gate through which melt can flow from the tip melt channel to the gate,
   wherein the tip comprises a first material including an exterior surface in the annular melt space, and wherein at least a portion of the exterior surface is coated with first a diamond or diamond-like coating.

9. A nozzle according to claim 8, wherein the surfaces of the nozzle seal that are exposed to the annular melt space comprise a second diamond or diamond-like coating.

10. An injection molding apparatus according to claim 9, wherein an interior surface of the tip adjacent the tip melt channel comprises a third diamond or diamond-like coating.

11. An injection molding apparatus according to claim 8, wherein an interior surface of the tip adjacent the tip melt channel comprises an additional diamond or diamond-like coating.

12. An injection molding apparatus according to any one of claims 8 to 11, wherein the diamond or diamond-like coating is applied directly to the surface(s).

13. An injection molding apparatus according to any one of claims 8 to 11, wherein the diamond or diamond-like coating is applied to an intermediate layer of a different material applied directly to the surface(s).

14. An injection molding apparatus according to claim 13, wherein the intermediate layer comprises molybdenum.

15. A tip for an injection molding nozzle for delivering melt flowing trough the nozzle to the gate area of a mold, the tip comprising:
   a tip body adapted to be retained by the injection molding nozzle adjacent the gate area of the mold the tip body including an interior surface and exterior surface;
   a tip melt channel extending through the tip body;
   and a diamond or diamond-like coating on at least one of said surfaces.

16. A tip according to claim 15, wherein the interior surface of the tip comprises the diamond or diamond-like coating.

17. A tip according to claim 15 or claim 16, wherein the diamond or diamond-like coating is applied directly to the surface(s).

18. A tip according to claim 15 or claim 16, wherein the diamond or diamond-like coating is applied to an intermediate layer of a different material applied directly to the surface(s).

19. A tip according to claim 18, wherein the intermediate layer comprises molybdenum.

* * * * *